Jan. 30, 1945.  A. PASCOO  2,368,564
TIRE PRESSURE GAUGE
Filed Sept. 16, 1943
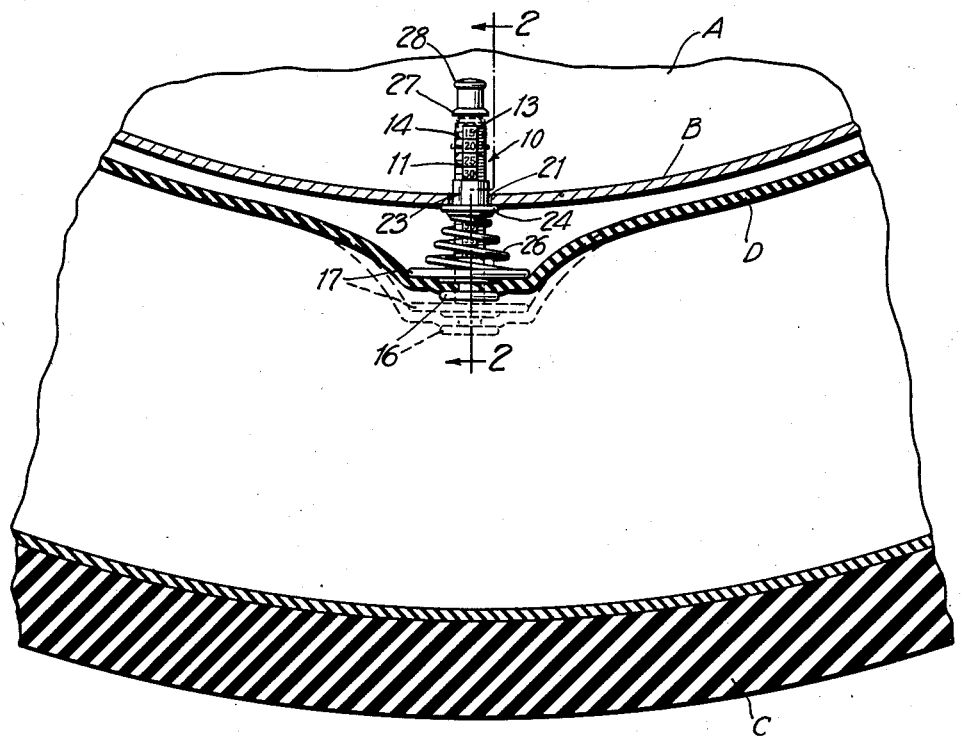
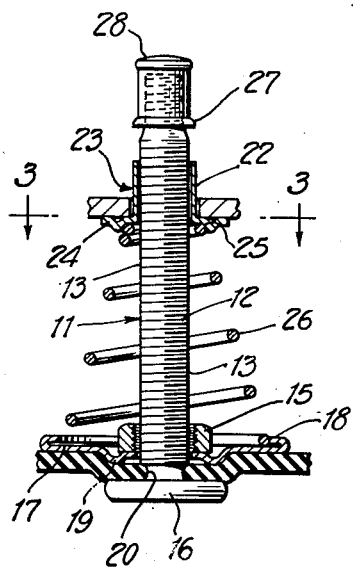
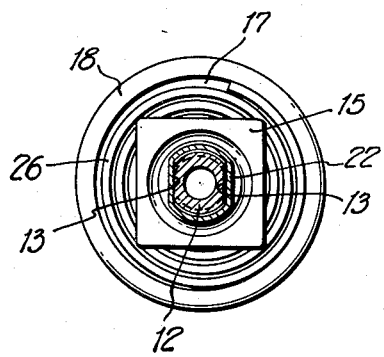
INVENTOR
ALEX PASCOO
BY
Ely & Pattison.
ATTORNEYS Patented Jan. 30, 1945

2,368,564

UNITED STATES PATENT OFFICE 2,368,564

TIRE PRESSURE GAUGE

Alex Pascoo, New York, N. Y.

Application September 16, 1943, Serial No. 502,647

2 Claims. (Cl. 137—69.5)

This invention relates to improvements in tire gauges for indicating the air pressure of pneumatic tires.

One of the important features of the invention resides in a tire gauge permanently carried by the wheel for indicating at all times the air pressure of a pneumatic tire.

Another feature of the invention is to provide a combined tire inflation valve and air pressure gauge, use being made of the valve body as the moving indicating element of the gauge.

A further feature of the invention is the provision of a pneumatic tire gauge which is simple of construction, easy to install, and which is accurate in its indication of tire air pressure.

Other novel features of the invention will become apparent as the following specification is read in conjunction with the accompanying drawing, in which:

Figure 1 is a fragmentary vertical circumferential sectional view through a wheel, showing my tire gauge in position thereon, the dotted lines indicating the position of the parts when the tire is deflated.

Figure 2 is an enlarged vertical transverse sectional view taken substantially on the line 2—2 of Figure 1.

Figure 3 is a horizontal sectional view on the line 3—3 of Figure 2.

Referring to the drawing by reference characters, the numeral 10 designates a combined tire inflation valve and air pressure gauge in its entirety which is shown in Figure 1 as being applied to an automobile wheel A. The wheel A is of conventional construction, and includes a metal rim B, a tire casing or shoe C which encloses a rubber inner tube D.

The combined tire inflation valve and air pressure gauge 10 includes a conventional Schrader-type valve 11, which includes a metal tubular body 12 through which air may be pumped into the inner tube D by the attachment of an air hose to the outer or upper end thereof. The inner check valve structure of the air valve 11 has been omitted, for it forms no part of the invention now to be described.

The valve body 12 is provided with opposed flat surfaces 13—13 which extend substantially the length thereof, and arranged on the flat surfaces 13—13 are spaced graduations 14 which are indicative of pounds air pressure and which are shown as calibrated in multiples of five pounds, starting from fifteen pounds at the top and increasing in amounts in a downwardly direction. The exterior of the valve body 12 exclusive of the flat surfaces 13—13 is screw threaded to threadedly receive a clamping nut 15. The lower end of the valve body 12 is provided with a flat circular head 16 and freely slidable on the valve body 12 intermediate the head 16 and the nut 15 is a circular clamping disk 17. The peripheral edge of the disk 17 is turned upwardly and inwardly to provide a flange 18, and the said disk is also provided with a concentric downwardly extending bead 19. The valve 11 is fixedly attached to the inner tube D, the tubular valve casing 12 passing through an opening 20 in the inner tube with the flat head 16 disposed on the inner side of the tube and the clamping disk 17 on the outer side, and said disk 17 being held in clamping relation to the head 16 by means of the clamping nut 15. By reason of the bead 19, a crimp is formed in the wall of the inner tube to provide an effective seal between the valve 11 and its clamping element.

The upper or outer end of the valve body 12 passes through an over size opening 21 in the rim B, said opening snugly receiving the tubular body 22 of a gauge member 23. The tubular body 22 is flattened on opposed sides complementary to the flattened sides 13—13 of the valve body 12 so that the valve body 12 is free to slide relative to the guide member 23 but is prevented from turning relative thereto. Integral with the lower end of the tubular body 22 is an annular flange 24, the same being formed with a downwardly extending bead which forms an annular seat 25 for receiving the upper or outer terminal end of a helical expansion spring 26. The spring 26 is of inverted cone shape with the largest convolution being seated against the clamping disk 17 and which is held against spreading by the inturned flange 18.

The outer inlet end of the valve 11 is reduced, and threaded thereon is a stop collar 27 which is disposed in the path of the outer end of the tubular body 22 of the gauge member 23. This prevents accidental separation of the gauge member 23 from the valve body 12 prior to the attachment of the combined tire valve and air pressure gauge to a wheel. The outer reduced threaded end of the valve body 12 also receives the usual screw cap 28 to protect the inner working parts of the valve and to aid in sealing the valve against leakage of air.

In practice, assume that the inner tube D is in a deflated condition, at which time the valve 11 and its parts will assume the position shown in dotted lines in Figure 1. This is due to the fact that the tension of the spring 26 is greater than the air pressure within the inner tube D. Air may be introduced into the inner tube D by connecting an air hose to the outer end of the valve body 12, whereupon air will enter the inner tube D through the valve body and as the pressure increases the inner tube will be distended against the tension of the spring 26. As the pressure within the tube D overcomes the tension of the spring 26, the valve body 12 will slide outwardly through the gauge member 23 and will continue to do so until the proper air pressure is reached. The reading of the air pressure may be taken by referring to either of the flat sides of the valve body 12, the graduations thereon being readable in line with the top edge of the tubular body 22 of the gauge member 23. By referring to Figure 1, the reading there shows an air pressure of slightly over thirty pounds. It will be understood that either of the flat faces bearing the graduations will face outwardly to permit of the easy reading of air pressure. As the air pressure in the tire decreases, the spring 26 will cause the valve body 12 to move inwardly, thus showing a lower air pressure reading. The owner of an automobile may refer to the gauge 10 and ascertain the air pressure of the tire without the necessity of applying a gauge to the air valve.

While I have shown and described what I consider to be the most practical embodiment of my invention, I wish it to be understood that such changes in construction as come within the scope of the appended claims may be resorted to if desired without departing from the spirit of the invention.

Having thus described the invention, what I claim as new and desire to secure by Letters Patent of the United States, is:

1. In combination, a wheel rim having a pneumatic valve opening therein and the inflatable inner tube of a pneumatic tire; a tire pressure gauge comprising a relatively short tubular gauge member freely extending through said opening and having an annular flange integral with the inner end thereof and abutting the inner side of said rim, an elongated air valve having a vertical column of air pressure graduations on the exterior thereof, said air valve freely slidable through the tubular gauge member, means fixedly securing the inner end of the valve to the wall of the inner tube, said means including a disk surrounding said valve and abutting the outer side of the inner tube and being of a diameter greater than the flange on said gauge member, and a cone-shaped helical expansion spring surrounding said valve member, said spring having its larger end convolution seated against said disk and its smaller end convolution seated against said flange whereby to hold the gauge member against movement and to exert a normal inward pressure against said inner tube.

2. In a combination as set forth in claim 1, including a stop collar fixedly secured to the valve adjacent the outer end thereof and disposed in the path of the gauge member for limiting the sliding movement of the valve under the action of the spring prior to the application of the tire pressure gauge to the rim and tube.

ALEX PASCOO.